Nov. 17, 1931.  T. F. BLUDWORTH ET AL  1,832,474
REMOTE CONTROL APPARATUS
Filed Sept. 23, 1929    2 Sheets-Sheet 1
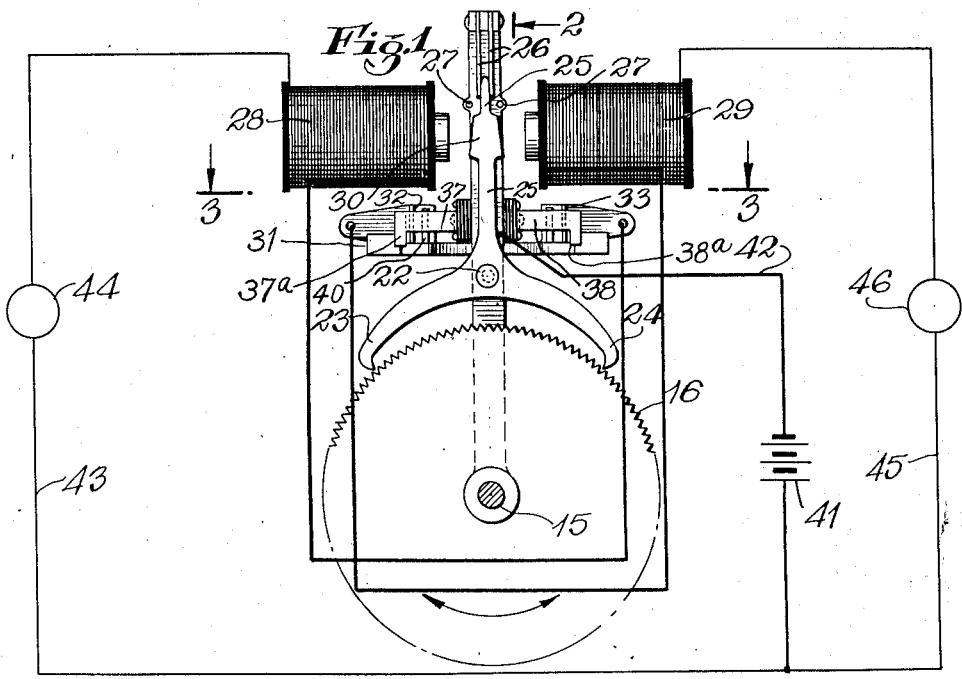
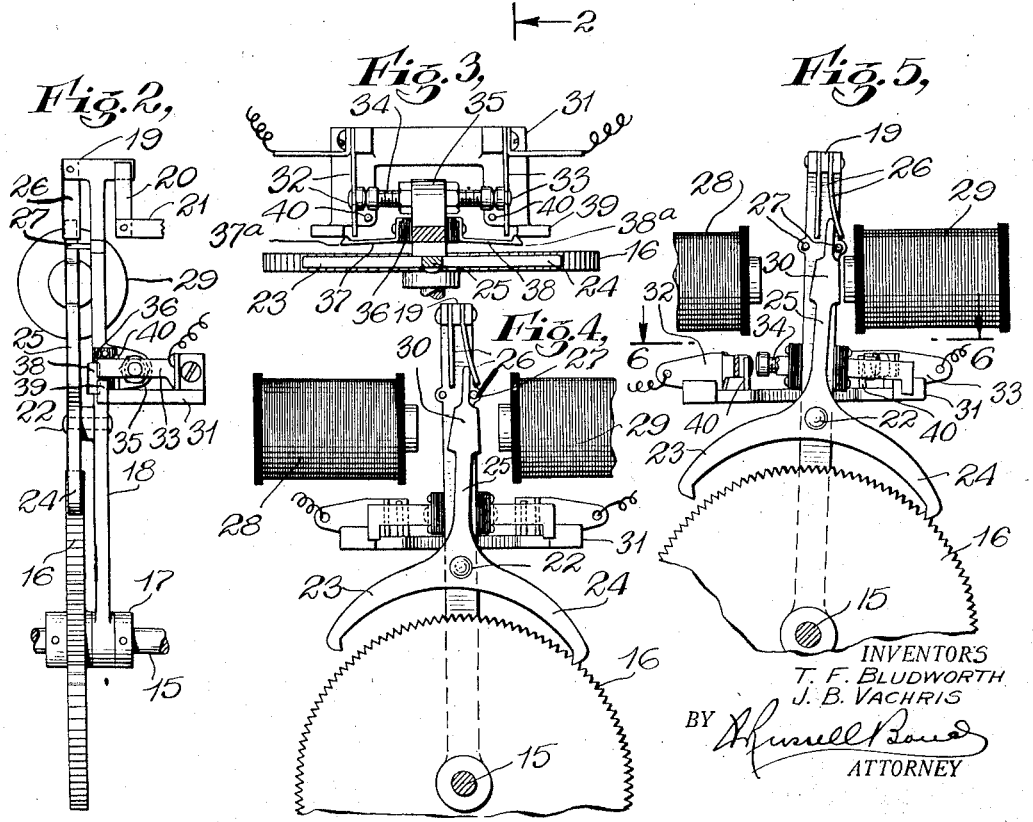
INVENTORS
T. F. BLUDWORTH
J. B. VACHRIS
BY
ATTORNEY

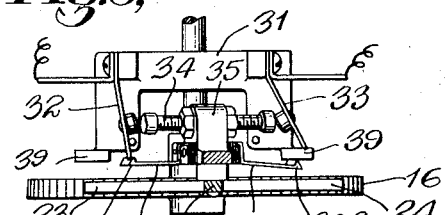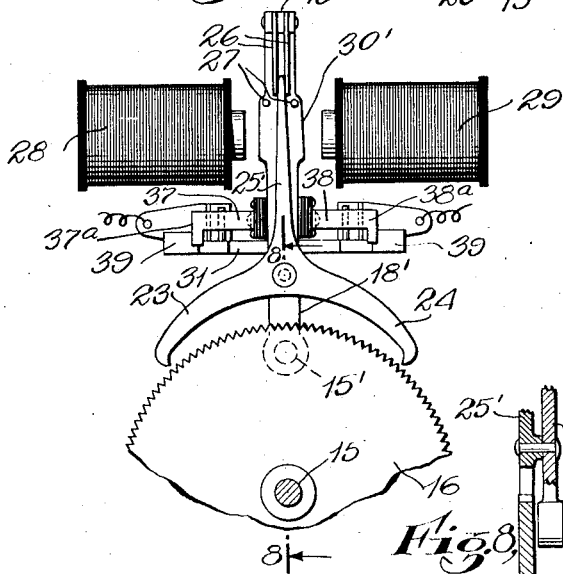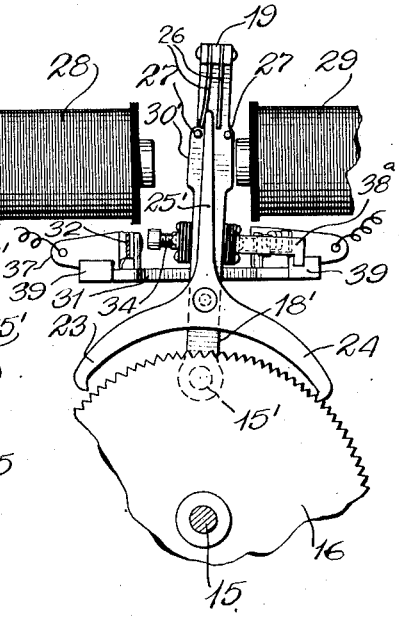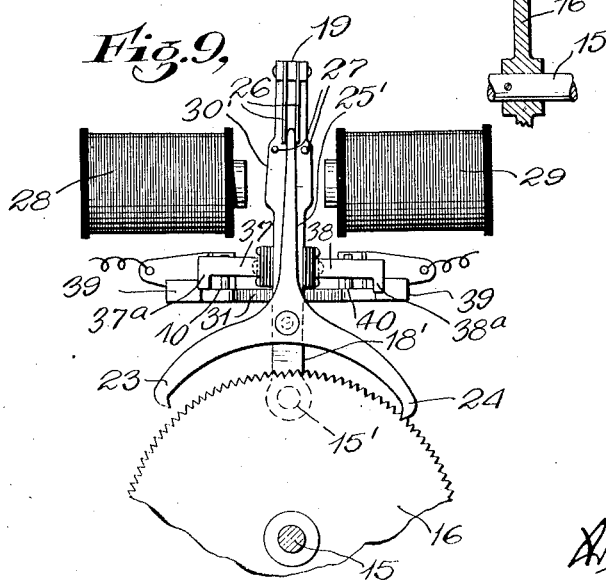
INVENTORS
T. F. BLUDWORTH
J. B. VACHRIS
BY
ATTORNEY Patented Nov. 17, 1931

1,832,474

UNITED STATES PATENT OFFICE

TIMOTHY F. BLUDWORTH, OF SUMMIT, NEW JERSEY, AND JOHN B. VACHRIS, OF BROOKLYN, NEW YORK, ASSIGNORS TO BLUDWORTH, INC., OF NEW YORK, N. Y., A CORPORATION OF NEW YORK

REMOTE CONTROL APPARATUS

Application filed September 23, 1929. Serial No. 394,600.

Our invention relates to remote control systems and has for an object to provide apparatus by which a device at a remote station may be operated step-by-step in response to impulses sent from a control station.

Another object of our invention is to provide an improved step-by-step motor which may be operated in either direction at the will of the operator.

Another object of the invention is to provide a very simple feed mechanism which will operate positively to feed a toothed wheel, one tooth at a time, either forward or backward.

Another object is to provide means for causing a device at a remote station to continue to move, step-by-step, as long as energy is supplied thereto. Thus, an operator at the control station does not need to transmit a separate impulse for each step of the motor but may hold a controller in operative position for any desired time period during which the step-by-step feed at the remote station will continue automatically at a predetermined rate.

Our invention is particularly adapted for use under circumstances in which the operator may determine by sound, or sight or by other means, the extent of movement of the step-by-step motor. Thus, in a radio receiver our remote control can be used for operating the variable condensers or other apparatus for tuning the receiver. The receiver set may be remote from the operator while the reproducer is nearby. The operator may then hold his finger on an advance or retard, as the case may be, until a desired station has been tuned in and will be able to determine when this has been properly effected by the nature of the sound coming from the reproducer. This relieves the operator of the necessity of depressing the button for each step of movement of the tuning apparatus. If he finds that the tuning apparatus has been turned too far in one direction all he needs to do is to depress the other button until the tuning apparatus has been returned to the proper position. Our remote control mechanism may also be used for controlling rheostats or other means for regulating volume of sound. It will be understood, however, that our invention is not limited to radio control but may be employed with other apparatus as well.

Another object of the invention is to provide a step-by-step control which, while comparatively quick acting will not be so quick as to prevent the operator from causing an advance of a single step by a momentary depression of the button. Thus, when desired, a fine regulation of feed may be had by one or a succession of quick depressions.

Other objects of the invention will appear in the following description of a preferred embodiment of our invention and of a modification of the same, and thereafter the novelty and scope of the invention will be pointed out in the claims.

In the accompanying drawings:

Figure 1 is a front elevation of a preferred embodiment of our invention certain parts being represented diagrammatically.

Fig. 2 is a view in vertical section taken on the line 2—2 of Fig. 1.

Fig. 3 is a view in transverse section taken on the line 3—3 of Fig. 1.

Figs. 4 and 5 are fragmentary views similar to Fig. 1, but showing respectively, certain parts of the device in successive positions.

Fig. 6 is a view in transverse section taken on the line 6—6 of Fig. 5.

Fig. 7 is a fragmentary view in front elevation of a modified form of our remote control device.

Fig. 8 is a detail view in section, the section being taken on the line 8—8 of Fig. 7.

Figs. 9 and 10 are views similar to Fig. 7, but show respectively, certain parts of the device in successive positions.

Referring particularly to Fig. 1, we have shown in section a driving shaft 15, which is adapted to operate any desired mechanism, such, for instance, as the variable condenser of a radio receiving set. However, the mechanism driven by the shaft 15 is not shown in the drawings, and neither do we show the bearings in which the shaft is supported.

Fixed upon the shaft 15 is a toothed wheel 16 and mounted to turn freely upon the shaft 15 between the wheel 16 and a collar 17 is an upwardly extending, main or pendulum arm 18. This arm is formed of some non-magnetizable material, such as brass, and, as shown in Fig. 2, is provided at its upper end with a cross head or T-head 19. The latter runs parallel to the axis of the shaft 15 and the rearward portion thereof fits between a pair of spring leaves 20 projecting from a suitable fixed support 21. These spring leaves serve to hold the arm 18 in upright position and yet will yield to lateral movements of the arm under conditions which will be described hereinafter.

Pivoted upon the arm 18 at a point 22, just above the toothed wheel 16, is a three-armed lever having two oppositely disposed lateral arms 23 and 24, respectively, and a third arm 25 which rises vertically and is resiliently retained at its upper end between a pair of spring leaves 26 depending from the forward projecting portion of the cross head 19. Pins 27 located respectively, at opposite sides of the arm 25 serve to limit the oscillation of the arm with respect to the arm 18. Each of the lateral arms terminates in a tooth adapted to engage the teeth of the wheel 16. When the arm 25 is in vertical position the arms 23 and 24 will just clear the wheel 16, as shown in Fig. 1.

On opposite sides of the arm 25 are electromagnets 28 and 29, respectively. An armature 30 for the magnets 28 and 29 is carried by the arm 25. This armature may be integral with the arm 25, in which case the three-armed lever is formed of soft iron, or it may be a separate soft iron block, in which case the lever is preferably formed of non-magnetic material. When, for instance, magnet 29 is energized it will attract the armature 30 drawing the arm 25 to the right, as shown in Fig. 4, and thereby causing the tooth at the end of the arm 24 to come into engagement with the wheel 16. At the same time the arm 25 will engage the pin 27 at the right hand side thereof and as the armature 30 continues to move toward the magnet 29, it will cause the arm 18 to swing toward the right, as shown in Fig. 5, thereby bodily advancing the three-armed lever and causing the wheel 16 to turn through an angle of one tooth spacing. Similarly, when magnet 28 is energized arm 23 will engage the wheel 16 and cause the latter to turn through an angle of one tooth spacing in the opposite direction.

To control the energizing of the magnets 28 and 29, we provide the following mechanism. Mounted on a suitable support 31 or bracket are two opposed spring contact members 32 and 33, respectively. Between these contact points is an adjustable contact member 34 carried by the arm 18, and the members 32 and 33 are normally sprung inward in engagement with the member 34. The latter comprises a pair of contact screws which are threaded into a bracket 35 secured to the arm 18 and are held at suitable adjustment by means of lock nuts. Mounted on the arm 18 but electrically insulated therefrom by blocks of insulation 36 are two resilient pusher arms 37 and 38 which project laterally and respectively in opposite directions from the arm 18. The pusher arms are formed at their outer ends with teeth 37a and 38a respectively, which are adapted to engage extensions of the contact springs 32 or 33 respectively. The bracket 31 is also provided with extensions 39 which in certain positions of the parts will engage the teeth 37a and 38a and spring them clear of the spring members 32 and 33, respectively. Mounted on the bracket 31 on the opossite side from the pusher arms 37 and 38, respectively, are pins 40 which serve as stops to limit the movement of the leaves 32 and 33.

Referring now to Fig. 1, it will be observed that electrical energy is furnished to the electromagnets from a battery 41. One terminal of the battery is connected by a line 42 to the arm 18 and hence to the adjustable contact member 34. The other terminal of the battery is connected by a wire 43 through a push button or other switch 44 to one terminal of the electromagnet 28, while another wire 45 runs from the same battery terminal through a push button 46 to one terminal of the magnet 29. The opposite terminals of the magnets 28 and 29 are connected to the spring contacts 33 and 32, respectively.

The operation of the mechanism is as follows: Assuming that it is desired to progress the wheel 16 in clockwise direction, as shown in Fig. 1, the operator depresses the button 46. This energizes magnet 29. The circuit may be traced from the battery through line 45, magnet 29, contacts 32 and 34, arm 18, and line 42, back to the battery. As soon as the magnet 29 is energized, it attracts the armature 30, oscillating the three-armed lever and forcing the arm 24 into engagement with the wheel 16, and then as the arm 25 reaches the pin 27, the arm 18 will be drawn to the position shown in Fig. 5, advancing the wheel 16 through one tooth spacing. As the arm 18 swings toward the right, the spring will follow and maintain contact with the member 34. This following movement is due to the resilience of spring 33. However, when the spring 32 is stopped by engagement with one of the pins 40, the tooth 37a will snap past the end of the spring 32 and the parts will assume the position shown in full lines in Fig. 6. The circuit through magnet 29 is broken as soon as the pin 40 causes separation of contact 32 from contact 34, but the momentum of the arm 18 will carry the tooth 37a past the spring 32. As soon as the magnet 29 is deenergized, the three-armed lever will be released and the arm 25 will return to alinement with the arm 18 under impulse of one of the leaf springs 26, and the arm 24 will disengage the wheel 16. An instant later the arm 18 will be swung back toward normal position by one of the leaf springs 26 acting on the cross-head 19. As the arm returns, however, the tooth 37a will push the spring contact member 32 before it holding it clear of the contact member 34. By reason of its momentum, the arm 18 will swing slightly past the vertical position sufficiently to permit engagement of the tooth 37a with one of the extensions 39, and as the tooth rides against said extension, the pusher arm 37 will be sprung sufficiently to clear the spring 32 and permit the circuit to be completed again by engagement of members 32 and 34. As soon as such contact is reestablished, the parts will go through the same cycle again, advancing the wheel 16 through another tooth spacing. Thus, as long as the operator holds down the push button 46, the mechanism will continue to operate, feeding the wheel 16 forward step-by-step through an angle of one tooth spacing at each step. If, on the other hand, the operator wishes to reverse the feed of the wheel 16, he depresses the button 44 and a circuit is then established from battery 41, through line 43, electromagnet 28, spring contact member 33, contact member 34, arm 18, and line 42, back to the battery. This will result in attracting the armature 30 toward the left, as shown in Fig. 1, and causing engagement of arm 23 with the wheel 16, followed by movement of the arm 18 toward the left and advance of the wheel 16 through an angle of one tooth spacing in counter clock-wise direction. The members 33 and 34 will remain in contact until the spring 33 is stopped by one of the pins 40, when the circuit will be broken and the parts will spring back toward normal position with the tooth 38a holding the contact member 33 clear of the member 34 until the arm 18 has swung slightly beyond normal position. The extension 39 will then spring the tooth 38a clear of the spring 33 and permit reestablishment of the circuit through the magnet 28. The operator at the remote station thus has complete control of the rotation of the wheel 16 in either direction and the angle through which the wheel is fed will depend upon the length of time either of the buttons 44 or 46 is depressed. The arm 18 and parts carried thereby act like a pendulum to determine the rate of operation which while quite rapid, is, at the same time, slow enough to permit the operator, by a momentary depression of one of the operating buttons, to feed the wheel 16 through a single tooth spacing, if he so desires.

The construction shown in Figs. 7 to 10 inclusive is somewhat similar to that already described. In this case, however, the magnets do not operate on the three-armed lever but operate instead upon the main or pendulum arm to which the lever is pivoted. In place of the pendulum arm 18, we use a shorter arm 18' which is journaled on a separate shaft 15' located above the shaft 15. The arm 18' is preferably made of soft iron so that it will serve as an armature for the electromagnets 28 and 29, and to this end, the arm is enlarged as is indicated at 30', immediately opposite said electromagnets. If desired, the arm 18' could be made of non-ferrous metal with a soft iron block secured thereto to serve as an armature for the electromagnets. Pivoted upon the arm 18' is a three-armed lever corresponding to that shown in Fig. 1, but which differs therefrom in the fact that its upright arm 25' bears no enlargement or block 30; furthermore, the three-armed lever is formed of non-magnetizable metal.

The remaining parts of the mechanism are identical with those shown in Figures 1 to 6 inclusive; the operation of the device, however, is slightly different. When, for instance, the push button 46 is energized, the magnet 29 is energized as before, but instead of attracting the three-armed lever, the first action is to draw the arm 18' toward the right, as shown in Figure 9, because the armature 30' is carried by the arm 18'. The three-armed lever will be swung into engagement with the wheel 16, as shown in Fig. 9, because the leaf springs 26 tend to hold the arm 25' in alinement with the arm 18'. Thus, during the initial oscillatory stroke of arm 18' the arm 24 will be brought into engagement with the teeth of the wheel 16. During the next portion of the stroke the arm 25' will swing toward the left with respect to the arm 18', until it engages a stop pin 27. Thereafter continued movement will cause the wheel 16 to turn through an angle of one tooth spacing, as shown in Fig. 10. As soon as this has taken place, the circuit through magnet 29 will be broken in the manner explained above and the parts will return toward normal position, only to swing again to the position shown in Fig. 10, when the circuit is reestablished, and feed the wheel 16 through another angle of one tooth spacing. The parts will operate in similar manner, but in reverse direction, when the button 44 is depressed, and as explained above, the number of steps taken by the wheel 16 in either direction will depend upon the length of time during which either of the buttons is held depressed.

While we have described two embodiments of our invention, we wish it to be understood that the constructions illustrated and described are merely illustrative and not limitative of our invention and that we reserve the right to make such modifications and variations in details of construction, arrangement of parts, and mode of operation, as fall within the spirit and scope of the following claims.

We claim:

1. In a device of the character described, a toothed wheel, a pair of electromagnets, an armature mounted to oscillate between the magnets, spring means tending to maintain the armature in central position between the magnets, a pair of pawls disposed respectively at opposite sides of the armature and respectively operable thereby to move the wheel in opposite directions, a normally open control switch, and a normally closed local switch in the circuit of each magnet, means for opening the local switch of an energized magnet after said magnet has drawn the armature a predetermined distance, means for holding the local switch open while the armature is returned by the spring to normal position and means for reclosing the circuit after the armature has returned to normal position.

2. In a device of the character described, a toothed wheel, a pair of electromagnets, an arm mounted to oscillate between the magnets, spring means tending to maintain the arm in central position between the magnets, a second arm pivoted on the first arm and provide with a pair of pawls adapted respectively to engage the wheel on opposite sides of the first arm, a resilient connection between the two arms for holding the pawls normally clear of the wheel, an armature on one of said arms, a normally open control switch and a normally closed local switch in the circuit of each magnet, the parts being so disposed that when the armature is attracted by one or the other of the magnets one of the pawls will first move into engagement with the wheel on the side adjacent the energized magnet and both arms will then move to turn the wheel through a predetermined angle, means operating to open the local switch of the energized circuit as soon as the wheel has moved through said angle, means holding said local switch open until the arm has returned to normal position, and means operating to close said local switch thereafter.

3. In a device of the character described, a toothed wheel, a pair of opposed electromagnets, an armature mounted to oscillate between the magnets, a spring tending to maintain the armature centrally between the magnets, a normally open control switch and a normally closed local switch in the circuit of each magnet, means associated with the armature for moving the wheel in the direction in which the armature is attracted, and means controlled by motion of the armature for intermittently opening and closing the local switch of the energized circuit the latter means including mechanism for holding the local switch open during each return movement of said arm.

4. In a device of the character described, a ratchet wheel having a single set of teeth, and a step-by-step feed mechanism therefor, the feed mechanism including a pair of electromagnets, and means including a single armature actuated thereby to drive the ratchet wheel in opposite directions respectively.

5. In a device of the character described, electromagnets mounted in spaced relation, a support mounted to swing toward and away from said magnets, an armature pivoted on said support in a position to be actuated by either of said electromagnets, a pair of pawls actuated by said armature, and a ratchet wheel driven by one or the other of said pawls, depending on the position of said support.

6. In a device of the character described, a ratchet wheel, a support mounted to swing in an arc about the axis of said wheel, an armature pivoted on said support, said armature being provided with a pair of pawls mounted respectively to drive said ratchet wheel in a forward, and a backward direction, and an electromagnet mounted at each side of said armature to actuate the same.

7. In a device of the character described, a ratchet wheel, a support mounted to swing at one side of the axis of said ratchet wheel, an armature pivoted on said support, said armature being provided with a pair of pawls mounted respectively to drive said ratchet wheel in a forward and a backward direction, means tending to keep said armature and said support in alinement, and an electromagnet mounted at each side of said armature to actuate the same.

8. In a device of the character described, a ratchet wheel, a support mounted to swing in an arc, an armature mounted on said support, said armature being provided with a forked end defining opposed pawls, an electromagnet at each side of said armature in position to actuate the same, resilient means tending to hold said armature and said support in alinement, and other resilient means tending to hold said support at substantially equal distances from said electromagnets.

9. In an article of the class described, a ratchet wheel having a single set of teeth, an armature terminating in one end in two pawls effective in opposite directions, said pawls being normally out of engagement with said ratchet wheel, and an electromagnet at each side of said armature, said electromagnets functioning to render one of said pawls effective to the exclusion of the other, whereby said pawls may drive said ratchet either forward or backward.

10. In an article of the class described, a ratchet wheel having a single set of teeth, a support mounted to swing at one side of said ratchet wheel, an armature pivoted on said support, said armature terminating at one end in two spaced opposing pawls, means tending to keep said armature and said support in alinement, an electromagnet at each side of said armature, and means tending to keep said support in predetermined relation to said electromagnets, said support when actuated by said armature in response to the attraction of one of said electromagnets determining which one of said pawls is to be effective.

In testimony whereof, we have signed this specification.

TIMOTHY F. BLUDWORTH.
JOHN B. VACHRIS.